(12) United States Patent
Koyama et al.

(10) Patent No.: US 8,040,616 B2
(45) Date of Patent: Oct. 18, 2011

(54) LENS BARREL AND IMAGING APPARATUS

(75) Inventors: Takashi Koyama, Tokyo (JP);
Kiyomitsu Furuyama, Aichi (JP);
Shohei Uno, Nara (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/460,036

(22) Filed: Jul. 10, 2009

(65) Prior Publication Data

US 2010/0014172 A1    Jan. 21, 2010

(30) Foreign Application Priority Data

Jul. 11, 2008    (JP) ............... P2008-181880

(51) Int. Cl.
*G02B 9/00* (2006.01)
*G02B 9/08* (2006.01)
*G02B 15/14* (2006.01)

(52) U.S. Cl. ...................... 359/740; 359/704
(58) Field of Classification Search .............. 359/739, 359/740, 703, 704
See application file for complete search history.

(56) References Cited

U.S. PATENT DOCUMENTS 5,790,316 A    8/1998    Terasawa et al.

FOREIGN PATENT DOCUMENTS

| JP | 4-133011 A | 5/1992 |
|----|----|----|
| JP | 6-201966 A | 7/1994 |
| JP | 7-294814 A | 11/1995 |
| JP | 08086947 A | 4/1996 |
| JP | 9-033781 A | 2/1997 |
| JP | 2001242365 A | 9/2001 |
| JP | 2003140016 A | 5/2003 |
| JP | 2007212958 A | 8/2007 |

OTHER PUBLICATIONS

Office Action from Japanese Application No. 2008-181880, dated Apr. 13, 2010.

*Primary Examiner* — Alicia M Harrington
(74) *Attorney, Agent, or Firm* — Lerner, David, Littenberg, Krumholz & Mentlik, LLP

(57) ABSTRACT

A lens barrel includes: a barrel body; a diaphragm pivotally held in the barrel body; a diaphragm operating member that changes the diameter of the diaphragm; an operation arm that can pivot in the barrel body and fits in the diaphragm operating member, the operation arm, when pivoted, changing the diameter of the diaphragm via the diaphragm operating member; and a light-blocking plate that prevents unwanted light from entering the barrel body and has a passage portion through which the operation arm passes and an engagement portion that an engaging piece protruding from the diaphragm operating member engages, the light-blocking plate, along with the diaphragm operating member, pivotally supported, wherein the passage portion has an opening having a width that is substantially the same as the width of the operation arm.

3 Claims, 14 Drawing Sheets

LENS BARREL AND IMAGING APPARATUS

CROSS-REFERENCE TO RELATED APPLICATION

The present application claims priority from Japanese Patent Application JP 2008-181880 filed in the Japanese Patent Office on Jul. 11, 2008, the entire content of which is incorporated herein by reference.

BACKGROUND OF THE INVENTION

1. Field of the Invention

The present invention relates to a lens barrel that houses a zoom lens or any other lens, and particularly to a lens barrel with a light-blocking plate that prevents flare and ghost images in the lens barrel.

2. Description of the Related Art

To prevent flare and ghost images resulting from unwanted light having entered a barrel, a lens barrel with a light-blocking plate that moves in the barrel as a zoom lens moves has been used. A lens barrel of this type includes a movable lens group and a movable light-blocking plate that move in the optical axis direction, and prevents flare and ghost images from being produced by moving the movable light-blocking plate to a predetermined position according to the position to which the movable lens group has moved (JP-A-06-201966 and JP-A-09-33781, for example).

Another example of the lens barrel that has been proposed includes a movable light-blocking plate having a variable-diameter opening and can prevent flare and ghost images from being produced when a movable lens group moves between a wide-angle position and a telescopic position by adjusting the diameter of the opening in the light-blocking plate while changing the position of the light-blocking plate relative to the movable lens group (JP-A-04-133011 and JP-A-07-294814, for example).

In general, a movable light-blocking plate of this type, in which the diameter of the opening can be changed, is configured in the lens barrel to have a plurality of light-blocking blades supported in such a way that they partially overlaps with each other and can pivot in the direction perpendicular to the optical axis direction. An operation mechanism for pivoting the plurality of light-blocking blades is formed in the lens barrel, and is driven manually by a user or automatically by a microcomputer or any other suitable component disposed in an imaging apparatus or the lens barrel.

Consider now a configuration in which the diameter of the opening in the movable light-blocking plate is automatically changed. When the operation mechanism and a drive source that provides a driving force to the operation mechanism are incorporated in the lens barrel, the lens barrel increases in size and weight. When the lens barrel increases in size and weight, the balance of the image apparatus as a whole deteriorates, and the portability of the lens barrel used as an interchangeable lens is impaired. The operation mechanism and the drive source are therefore desirably provided in a camera body to achieve a compact, lightweight lens barrel.

On the other hand, to change the diameter of the opening formed by the light-blocking blades from the camera body side, an operation member for pivoting the light-blocking blades should extend into the lens barrel, and the light-blocking blades may not be disposed in the region where the operation member pivots, possibly resulting in insufficient blockage of unwanted light.

SUMMARY OF THE INVENTION

To address the problems described above, it is desirable to provide a lens barrel that allows a light-blocking member to reliably block incident unwanted light even when an operation member for operating the light-blocking member extends into the lens barrel. It is further desirable to provide an imaging apparatus using the lens barrel.

According to an embodiment of the invention, there is provided a lens barrel including a barrel body, a diaphragm pivotally held in the barrel body, a diaphragm operating member that changes the diameter of the diaphragm, an operation arm that can pivot in the barrel body and fits in the diaphragm operating member, the operation arm, when pivoted, changing the diameter of the diaphragm via the diaphragm operating member, and a light-blocking plate that prevents unwanted light from entering the barrel body and has a passage portion through which the operation arm passes and an engagement portion that an engaging piece protruding from the diaphragm operating member engages, the light-blocking plate, along with the diaphragm operating member, pivotally supported. The passage portion has an opening having a width that is substantially the same as the width of the operation arm.

An imaging apparatus according to another embodiment of the invention includes an apparatus body and a lens barrel, the lens barrel including a barrel body, a diaphragm pivotally held in the barrel body, a diaphragm operating member that changes the diameter of the diaphragm, an operation arm that can pivot in the barrel body and fits in the diaphragm operating member, the operation arm, when pivoted, changing the diameter of the diaphragm via the diaphragm operating member, and a light-blocking plate that prevents unwanted light from entering the barrel body and has a passage portion through which the operation arm passes and an engagement portion that an engaging piece protruding from the diaphragm operating member engages, the light-blocking plate, along with the diaphragm operating member, pivotally supported. The passage portion has an opening having a width that is substantially the same as the width of the operation arm.

In the lens barrel and the imaging apparatus according to the embodiments of the invention, with the operation arm passing through the light-blocking plate and the engaging piece passing through the engagement portion, the light-blocking plate, when the operation arm rotates the diaphragm operating member, is rotated by the engaging piece and the operation arm in the same direction as the direction in which the diaphragm operating member is rotated. Therefore, the passage portion of the light-blocking plate only needs to have an opening with a minimum width necessary to allow the operation arm to pass through but does not need to be open over the region where the operation arm pivots. The light-blocking plate can therefore block more unwanted incident light and reliably prevent ghost and flare images.

DESCRIPTION OF THE PREFERRED EMBODIMENTS

Figure 1:
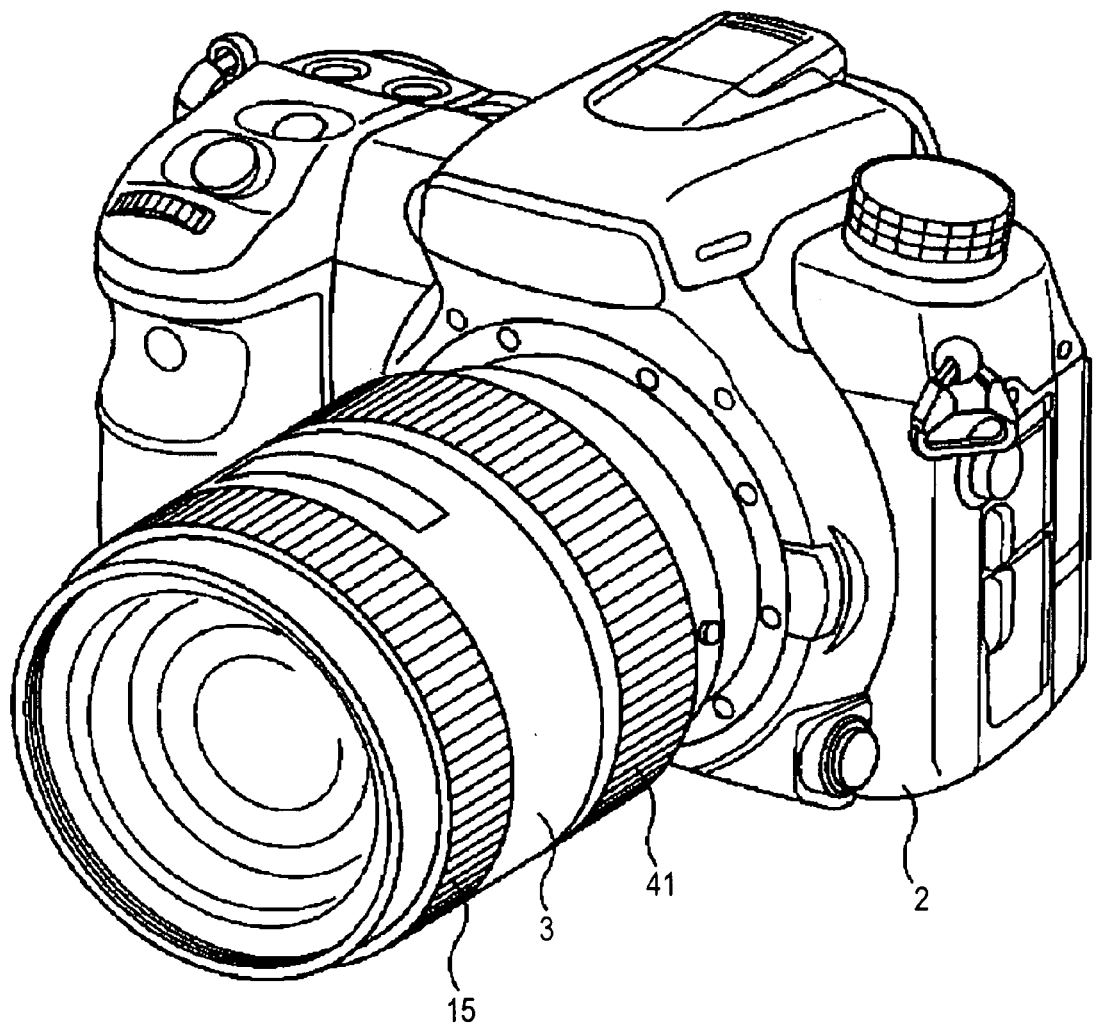
FIG. 1 is an exterior perspective view showing an imaging apparatus to which the invention is applied.
Figure 2:
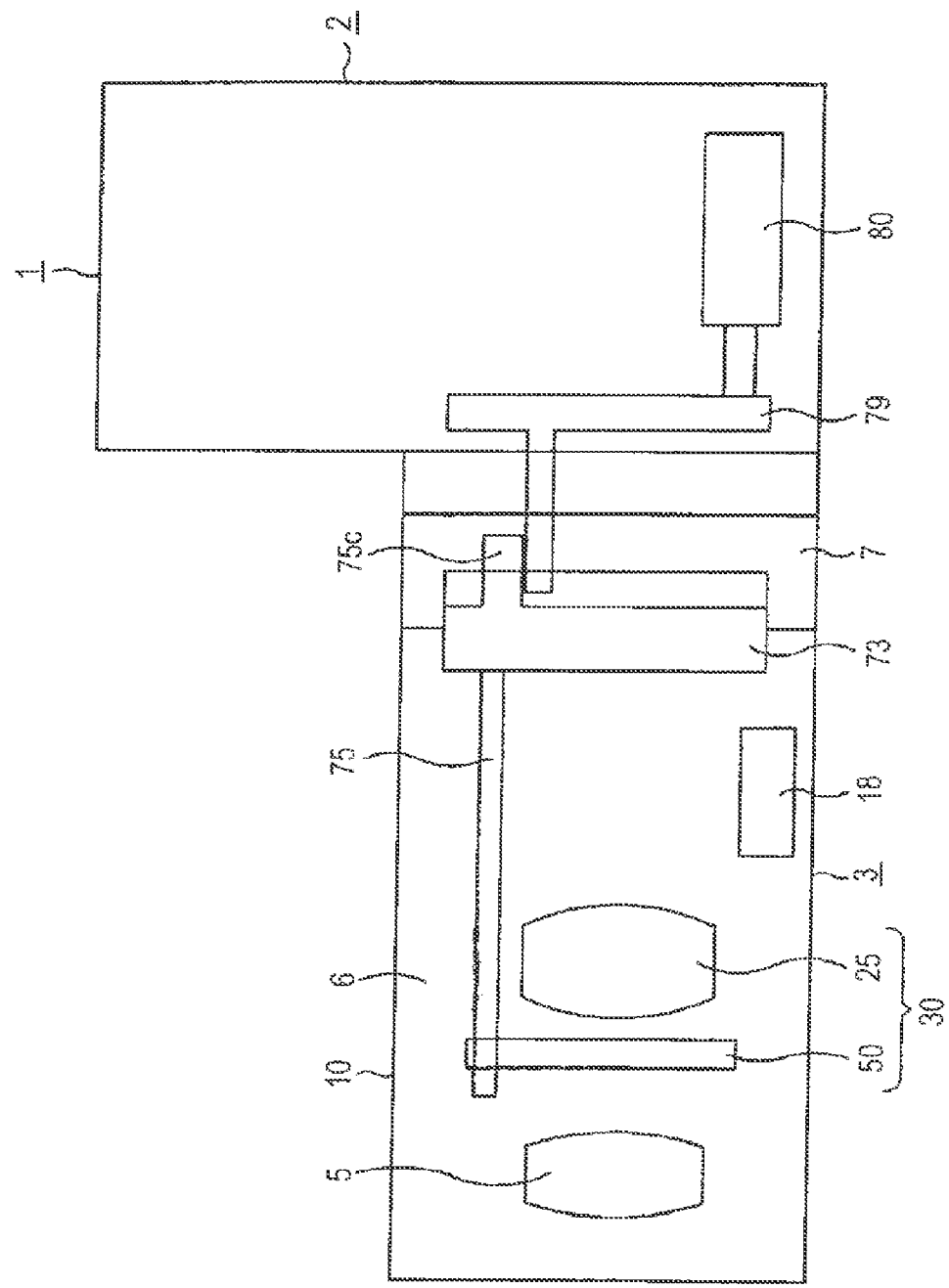
FIG. 2 is a schematic configuration diagram showing the imaging apparatus to which the invention is applied.

A lens barrel and an imaging apparatus to which the invention is applied will be described below in detail with reference to the drawings. An imaging apparatus 1 to which the invention is applied includes a camera body 2 and an interchangeable lens 3, as shown in FIGS. 1 and 2.

Figure 3:
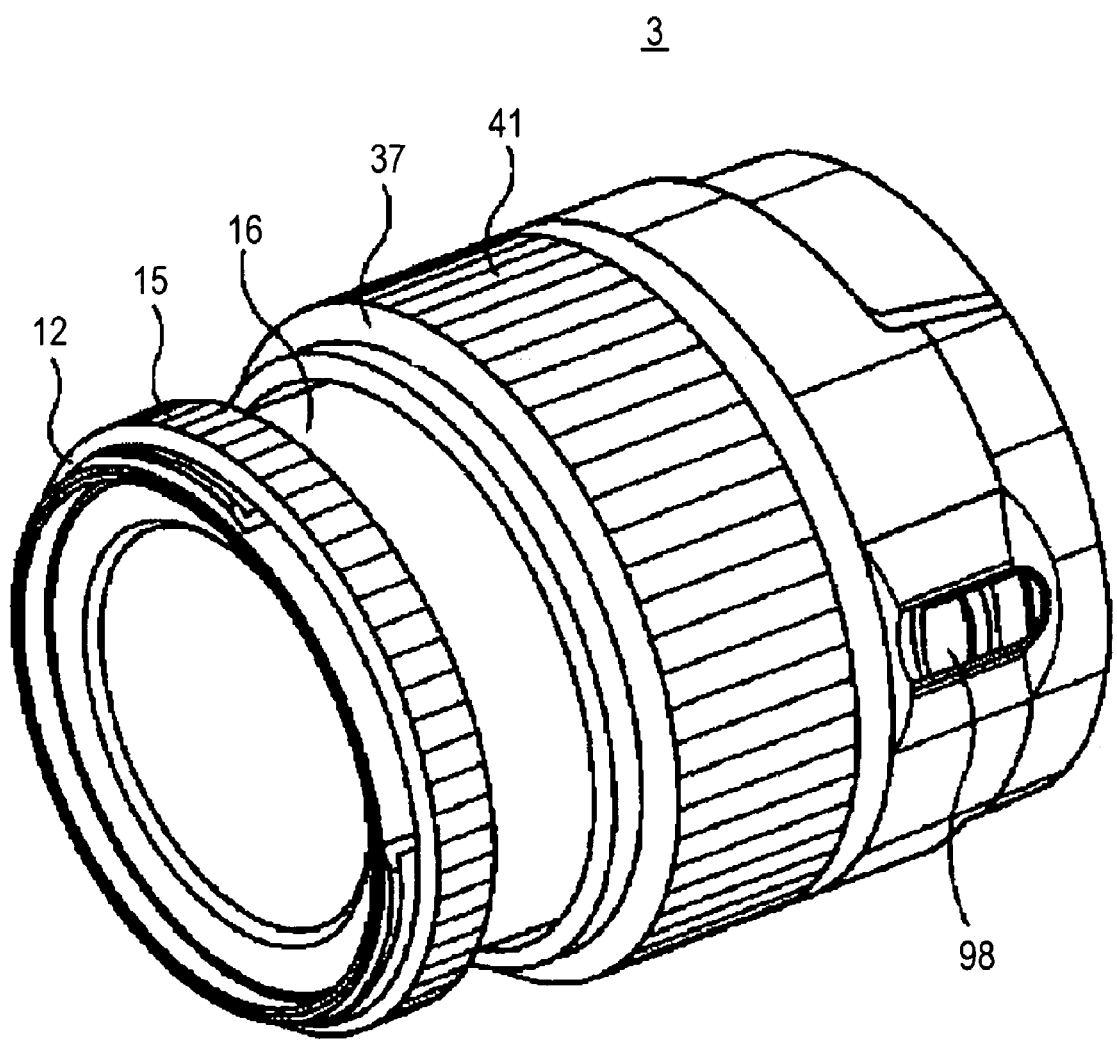
FIG. 3 is an exterior perspective view of an interchangeable lens.
Figure 4:
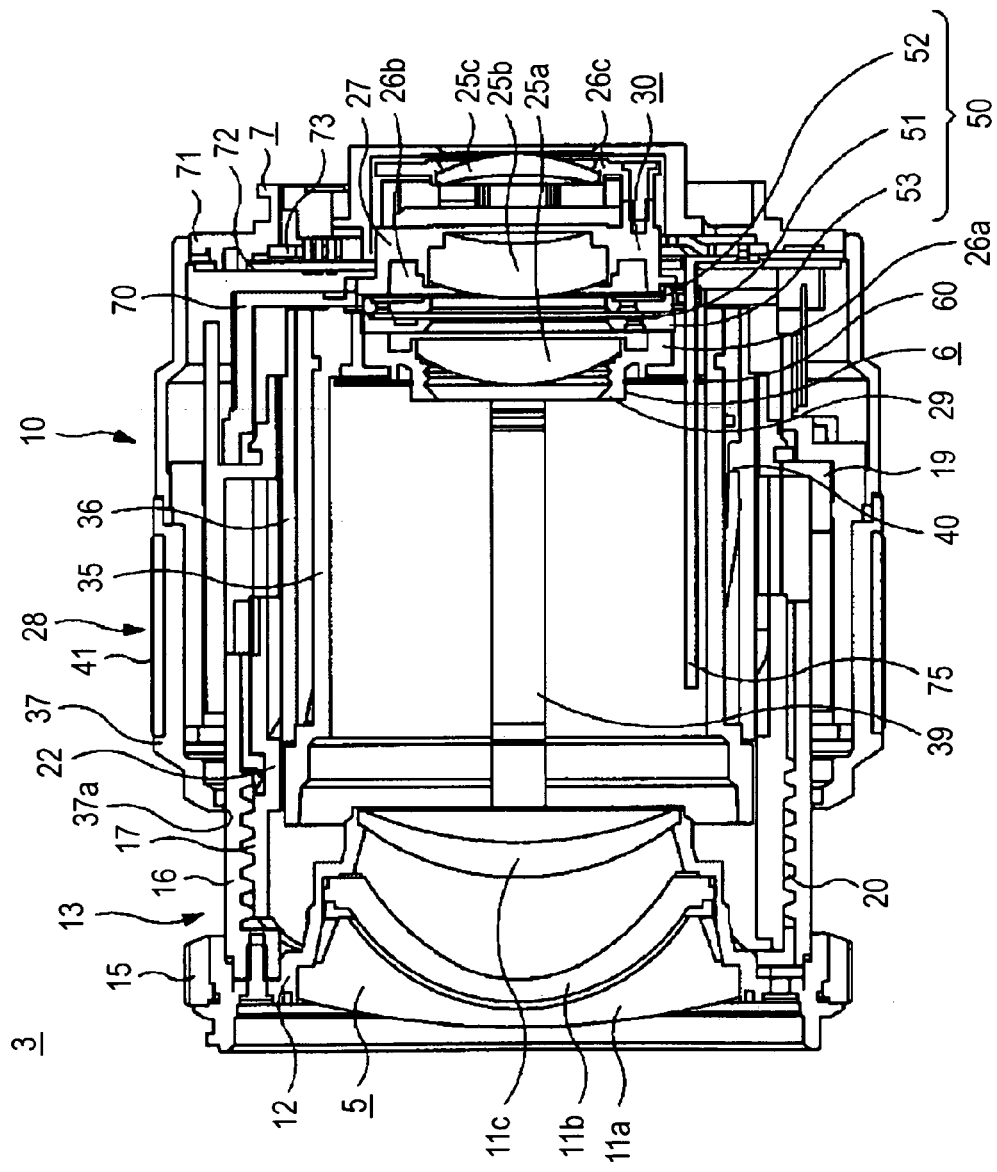
FIG. 4 is a cross-sectional view of the interchangeable lens.

The interchangeable lens 3 includes a barrel body 10 having a plurality of annular members assembled in such a way that the barrel body 10 has a substantially cylindrical external shape. As shown in FIGS. 3 and 4, the barrel body 10 includes a focus lens block 5 formed on the front side in the longitudinal direction, the focus lens block 5 including a focus lens group and a focus lens moving mechanism that moves the focus lens group in the optical axis direction. The barrel body 10 further includes a zoom lens block 6 formed on the rear side in the longitudinal direction, the zoom lens block 6 including a movable block 30, in which a zoom lens group is integrated with a diaphragm unit, and a zoom lens moving mechanism that moves the movable block 30 in the optical axis direction. In the barrel body 10, the focus lens moving mechanism shifts the focus lens group for focusing, and the zoom lens moving mechanism shifts the zoom lens group and the focus lens group for zooming.

The barrel body 10 further includes a mount block 7 formed on the rear side of the barrel body 10, the mount block 7 including a mount 71, which is a lens mount and attached to the camera body 2, and a substrate 72 on which a variety of drive circuits are formed. The mount block 7 allows the barrel body 10 to be attached and detached to and from the camera body 2. The mount 71 of the imaging apparatus 1 is what is called a bayonet lens mount.

The focus lens block 5 provided on the front side of the barrel body 10 will first be described. As shown in FIG. 4, the focus lens block 5 includes a plurality of focus lenses 11a, 11b, and 11c, a focus lens holding frame 12 that holds the plurality of focus lenses 11a to 11c with the optical axes thereof aligned, and a focus lens moving mechanism 13 that shifts the focus lens holding frame 12 forward/rearward along the barrel body 10.

The focus lens holding frame 12 forms a front end portion of the barrel body 10, houses and holds the plurality of focus lenses 11a to 11c, and is fastened to a focus operation ring 16, which forms the focus lens moving mechanism 13, with screws. The outer circumferential portion of the focus lens holding frame 12 fits in a focus ring 15. The focus ring 15 is used when a user manually performs focusing control, and knurled over the outer circumferential portion to enhance operability.

The focus lens moving mechanism 13, which moves the focus lens 11 held in the focus lens holding frame 12 in the optical axis direction, includes the focus operation ring 16 to which the focus lens holding frame 12 is attached, a focus actuation ring 17 that engages the inner side of the focus operation ring 16, an autofocus motor 18 (see FIG. 5) that provides a driving force to the focus operation ring 16, and a transfer ring for focusing 19 that transfers the driving force produced by the autofocus motor 18 to the focus operation ring 16.

The focus operation ring 16 has a substantially cylindrical shape and is supported in such a way that the focus operation ring 16 can advance/retract through a front-side opening 37a in a zoom operation ring 37, which will be described later. The focus operation ring 16 has a helical groove formed in the inner surface, and the helical groove and a mating helical groove formed in the outer circumferential surface of the focus actuation ring 17 form a helicoid 20. The focus operation ring 16 can therefore move along the helicoid 20, whereby the focus lens 11 can move in the optical axis direction.

The focus actuation ring 17 has a substantially cylindrical shape. The helical groove, which is part of the helicoid 20 as described above, is formed in the outer circumferential surface of the focus actuation ring 17, and a plurality of cams 22 protrude from the inner circumferential surface of the focus actuation ring 17 and are disposed at predetermined spacings in the circumferential direction. The cams 22 engage cam followers (not shown) formed on the outer circumferential surface of a cam ring 36, which will be described later. A plurality of guide ribs (not shown) also protrude from the inner circumferential surface of the focus actuation ring 17 and are disposed at predetermined spacings in the circumferential direction. The guide ribs engage linear guide grooves (not shown) formed in the outer circumferential surface of a fixed ring 35, which will be described later. The focus actuation ring 17, when the cam ring 36 is rotated in a zooming operation, is moved along the linear guide grooves in the fixed ring 35, and positioned in accordance with the positions of the cams 22, which engage the cam followers on the cam ring 36. On the other hand, in a focus operation, the focus actuation ring 17 serves as a fixed portion that shifts the focus operation ring 16 forward/rearward via the helicoid 20.

The autofocus motor 18, which provides a driving force to the focus operation ring 16, is attached to the mount 71, which will be described later. The autofocus motor 18 is connected to the focus operation ring 16 via a reduction gear train 23 and the transfer ring for focusing 19, and driven in a controlled manner by a microcomputer 95 that forms a controller provided on the substrate 72 on the mount 71.

The transfer ring for focusing 19 has a substantially cylindrical shape and is rotatably supported by the inner circumferential surface of a mount fixing member 70, which will be described later, through bayonet connection. The transfer ring for focusing 19 is connected to the reduction gear train 23 and the focus operation ring 16. When the autofocus motor 18 is driven, the reduction gear train 23 rotates the transfer ring for focusing 19, which in turn transfers the rotational force to the focus operation ring 16. The focus operation ring 16 to which the driving force is transferred through the transfer ring for focusing 19 is shifted along the helicoid 20 formed in the outer circumferential surface of the focus actuation ring 17. In this way, the focus lens moving mechanism 13 can move the focus lens 11 to a proper position for focusing.

Figure 5:
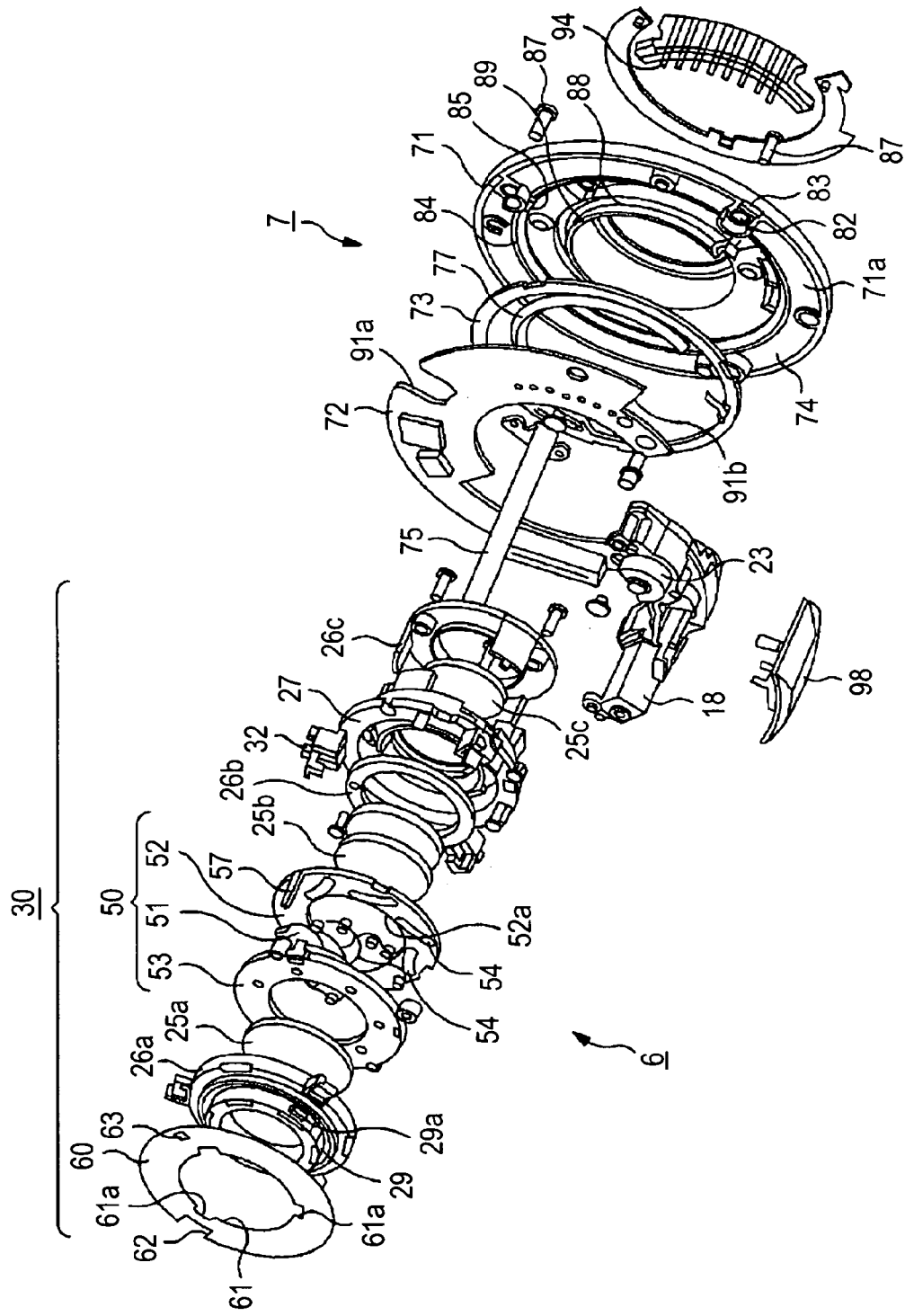
FIG. 5 is an exploded perspective view of a zoom lens block and a mount block.
Figure 6A:
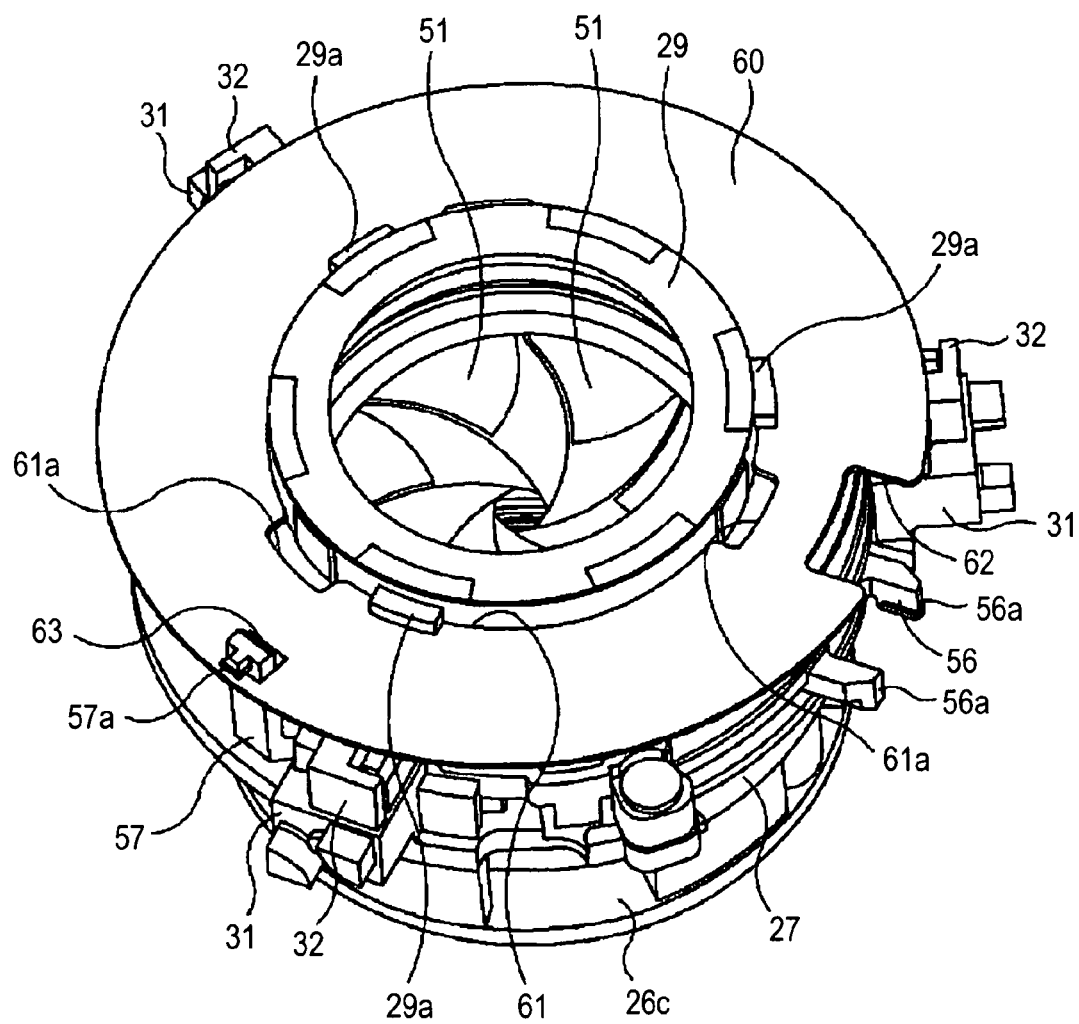
FIG. 6A is a front perspective view showing a movable block.
Figure 6B:
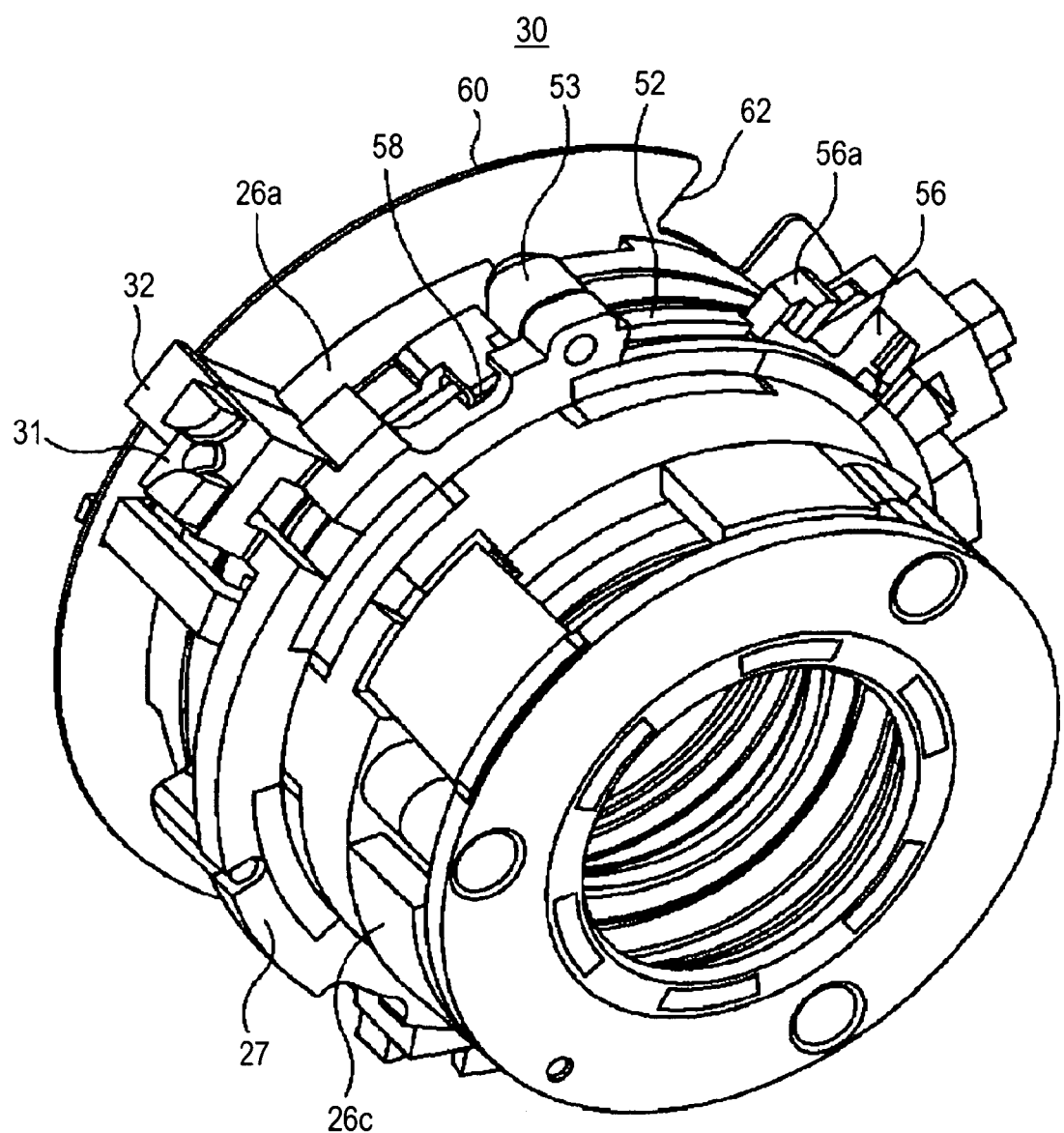
FIG. 6B is a rear perspective view showing the movable block.

The zoom lens block 6, which is provided on the rear side of the barrel body 10, will next be described. As shown in FIGS. 4 and 5, the zoom lens block 6 includes a plurality of zoom lenses 25a, 25b, and 25c, a plurality of zoom lens holding frames 26a, 26b, and 26c that hold the plurality of zoom lenses 25a to 25c with the optical axes thereof aligned, a zoom actuation ring 27 to which the zoom lens holding frames 26a to 26c are attached, and a zoom lens moving mechanism 28 that shifts the zoom actuation ring 27 forward/rearward along the barrel body 10 for zooming. The zoom lenses 25a to 25c and the lens holding frames 26a to 26c along with a diaphragm unit 50 and a light-blocking plate 60, which will be described later, are attached to the zoom actuation ring 27, and the integrated structure forms the movable block 30 as shown in FIGS. 6A and 6B, which is moved by the zoom lens moving mechanism 28 in the optical axis direction.

The first zoom lens holding frame 26a holds the first zoom lens 25a and is secured with screws or other fasteners to the front side of the zoom actuation ring 27 with the diaphragm unit 50 interposed between the first zoom lens holding frame 26a and the zoom actuation ring 27. The first zoom lens holding frame 26a has a placement portion 29 that protrudes toward the front side of the barrel body 10 and to which the light-blocking plate 60, which will be described later, is placed. The placement portion 29 has locking protrusions 29a that lock the light-blocking plate 60. The locking protrusions 29a are formed, for example, at three locations at predetermined spacings.

The second lens holding frame 26b holds the second zoom lens 25b, fits in the front side of the zoom actuation ring 27, and is secured thereto with screws or other fasteners. The third lens holding frame 26c holds the third zoom lens 25c and is secured with screws or other fasteners to the rear side of the zoom actuation ring 27.

The zoom actuation ring 27, to which the zoom lens 25, the zoom lens holding frame 26, and the diaphragm unit 50 are attached, is moved by the zoom lens moving mechanism 28. The zoom actuation ring 27 has cam followers 31 that engage the cam ring 36 in the zoom lens moving mechanism 28. The cam followers 31 are formed on the outer circumferential surface of the zoom actuation ring 27, for example, at three locations at predetermined spacings. When the cam ring 36 is rotated, the cam followers 31, which are formed on the zoom actuation ring 27 and engage cam protrusions 40 formed on the cam ring 36, are moved along the cam protrusions 40. The zoom actuation ring 27 further includes guide pieces 32 that are formed on the outer circumferential surface thereof and guided along guide protruding threads 39 formed on the inner circumferential surface of the fixed ring 35. Each of the guide pieces 32 has a pair of upper and lower locking pieces that slidably lock the corresponding guide protruding thread 39. The guide pieces 32 on the outer circumferential surface of the zoom actuation ring 27 are formed, for example, at three locations arranged at predetermined spacings.

The movable block 30 is positioned in the barrel body 10 because the cam followers 31 on the zoom actuation ring 27 engage the cam protrusions 40 on the can ring 36 and the guide protruding threads 39 on the fixed ring 35 lock the guide pieces 32, and the movable block 30, when the cam ring 36 is rotated, is moved while guided along the guide protruding threads 39.

The zoom lens moving mechanism 28, which moves the movable block 30 for zooming, includes the fixed ring 35, the cam ring 36, which rotatably fits on the outer circumferential surface of the fixed ring 35 and slidably supports the zoom actuation ring 27, and the zoom operation ring 37, which is rotatably provided outside the cam ring 36, as shown in FIG. 4.

The fixed ring 35, when attached to the mount fixing member 70 to which the mount block 7 is fixed, serves as a fixed portion that rotatably supports the cam ring 36 and the zoom operation ring 37, and the cylindrical outer circumferential surface of the fixed ring 35 fits in the cam ring 36. The guide protruding threads 39, which guide the motion of the movable block 30, are formed on the inner circumferential surface of the fixed ring 35, for example, at three locations at predetermined spacings in the circumferential direction. The fixed ring 35 further has linear guide grooves (not shown) formed in the outer circumferential surface thereof and engaging the guide ribs on the focus actuation ring 17 described above.

The cam ring 36 moves the movable block 30 along the guide protruding threads 39 on the fixed ring 35 in coordination with the rotation of the zoom operation ring 37. The fixed ring 35 fits in the cam ring 36 through bayonet engagement in such a way that the cam ring 36 can rotate around the fixed ring 35 but the position of the cam ring 36 relative to the fixed ring 35 is fixed in the front-to-rear direction thereof. The cam ring 36 has the cam protrusions 40 formed on the inner circumferential surface thereof, and the cam protrusions 40 engage the cam followers 31 formed on the outer circumferential surface of the zoom actuation ring 27. The cam protrusions 40 are formed, for example, at three locations in the circumferential direction of the cam ring 36 at predetermined spacings.

The cam ring 36, when rotated around the outer circumferential surface of the fixed ring 35 in coordination with the rotation of the zoom operation ring 37, moves the zoom actuation ring 27 forward/rearward via the cam protrusions 40. The cam ring 36, which has the cam followers (not shown) that engage the cams 22 on the focus actuation ring 17 described above, also moves the focus actuation ring 17 forward/rearward when the cam ring 36 is rotated in coordination with the rotation of the zoom operation ring 37. The focus actuation ring 17 is moved forward/rearward while the guide ribs are guided along the linear guide grooves formed in the fixed ring 35.

The zoom operation ring 37 provided outside the cam ring 36 forms a substantially middle portion of the barrel body 10, has a substantially cylindrical shape, and is rotatably supported. The zoom operation ring 37 has the front-side opening 37a through which the focus operation ring 16 advances/retracts. The zoom operation ring 37 is connected to the cam ring 36 via a transfer mechanism, the detail of which is omitted, and when rotated, transfers the rotational force to the cam ring 36. A zoom ring 41 fits on the outer circumferential surface of the zoom operation ring 37. The zoom ring 41 is used when the user manually performs zooming control, and knurled over the outer circumferential portion to enhance operability.

Figure 7:
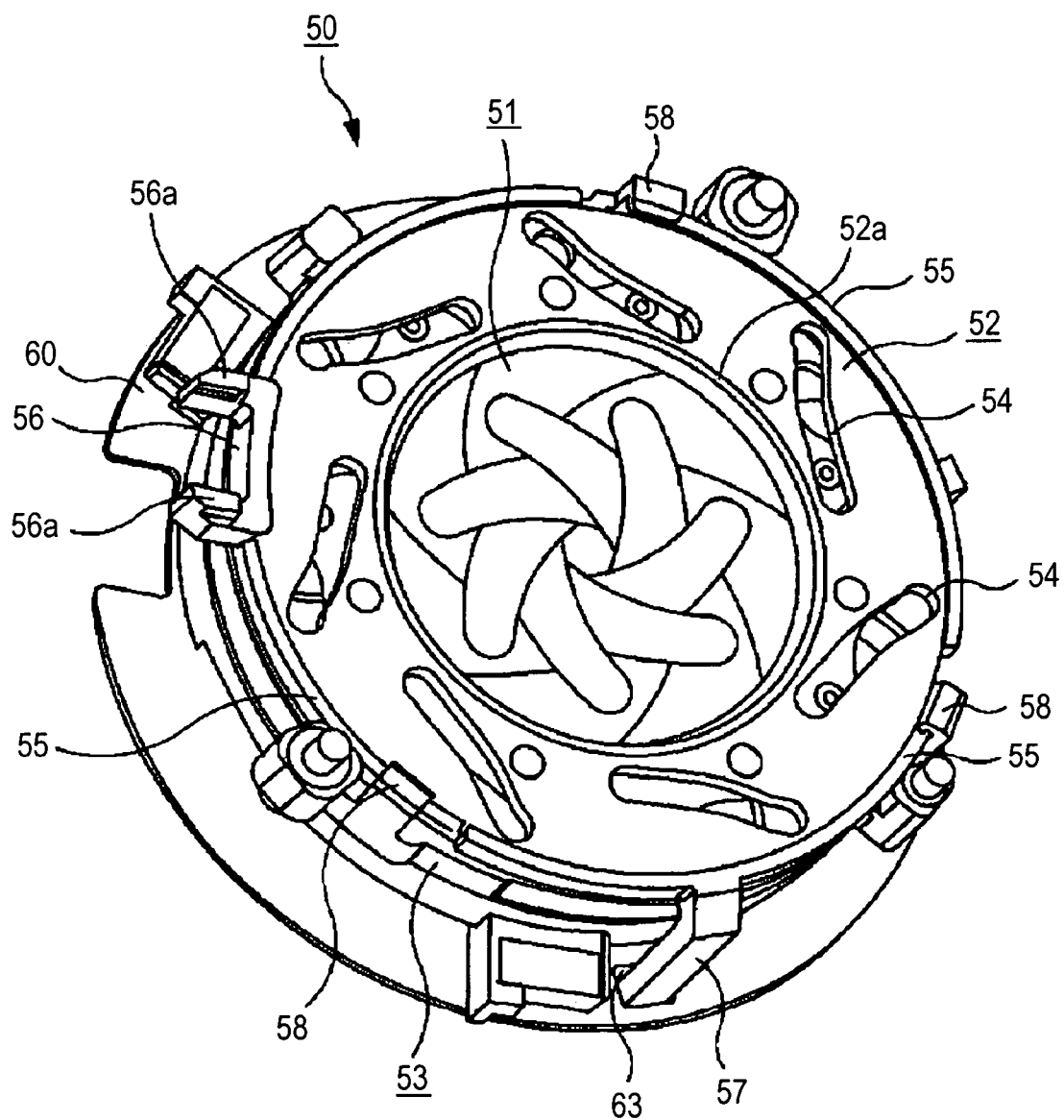
FIG. 7 is a rear perspective view showing a diaphragm unit with a light-blocking plate mounted thereon.

The diaphragm unit 50, which is, along with the lens holding frame 26, attached to the zoom actuation ring 27 will next be described. As shown in FIGS. 5 and 7, the diaphragm unit 50 includes a plurality of diaphragm blades 51 that increase/decrease the amount of incident light in accordance with the diameter of the opening, a diaphragm operating plate 52 that pivots the diaphragm blades 51, and a pressing plate 53 that, along with the diaphragm operating plate 52, pivotally supports the diaphragm blades 51. In the diaphragm unit 50, the diaphragm operating plate 52 is rotatably attached to the pressing plate 53, and the diameter of the opening is adjusted when an operation arm 75 provided on an operation ring 73 supported by the mount 71 rotates the diaphragm operating plate 52 to pivot the diaphragm blades 51.

Each of the diaphragm blades 51 has a light-blocking surface that blocks the light having entered the barrel body 10, and a support protrusion and a guide pin stand from one end of the light-blocking surface, the support protrusion pivotally supported by the pressing plate 53 and the guide pin engaging a corresponding guide groove for pivotal motion in the diaphragm operating plate 52. The diaphragm blades 51 are sandwiched and supported between the diaphragm operating plate 52 and the pressing plate 53 with the light-blocking surfaces overlapping with one another, and the diameter of the opening formed by the diaphragm blades 51 can be increased/decreased in accordance with the pivot angle. The diaphragm blades 51, in coordination with the rotation of the diaphragm operating plate 52, pivot around the support protrusions while the guide pins are guided along the guide grooves.

The diaphragm operating plate 52 has a circular shape with a central light incident hole 52a, and a plurality of guide grooves 54 that engage the guide pins on the diaphragm blades 51 are formed in the principal surface of the diaphragm operating plate 52. The diaphragm operating plate 52 adjusts the diameter of the opening at the light incident hole 52a by pivoting the diaphragm blades 51 along the guide grooves 54. Locking edges 55 are formed on the outer circumferential surface of the diaphragm operating plate 52, and locking pins 58 on the pressing plate 53 lock the locking edges 55. The diaphragm operating plate 52 is rotatably attached to the pressing plate 53 when each of the locking edges 55 locks the tip of the corresponding locking pin 58. A passage portion 56 is formed at part of the periphery of the diaphragm operating plate 52, and the operation arm 75 on the diaphragm operating ring 73 passes through the passage portion 56. The passage portion 56 is formed of a pair of support walls 56a and 56a standing from the diaphragm operating plate 52. The support walls 56a and 56a face each other with a gap that is substantially the same as the width of the operation arm 75. When the operation arm 75 is rotated around the central axis of the diaphragm operating plate 52, the diaphragm operating plate 52 is rotated in the same direction. When the movable block 30 moves in the optical axis direction, the operation arm 75 moves relative to the passage portion 56 through the gap between the support walls 56a and 56a.

The diaphragm operating plate 52 further has an engaging piece 57 that passes through and engages an engaging hole 63 formed in the light-blocking plate 60, which will be described later. The engaging piece 57 prevents the light-blocking plate 60, which fits on the placement portion 29 of the first lens holding frame 26a, from falling when the movable block 30 is moved to the front side of the barrel body 10. The engaging piece 57 protrudes from part of the periphery of the diaphragm operating plate 52 toward the front side of the barrel body 10, and passes through the engaging hole 63 in the light-blocking plate 60.

Figure 8A:
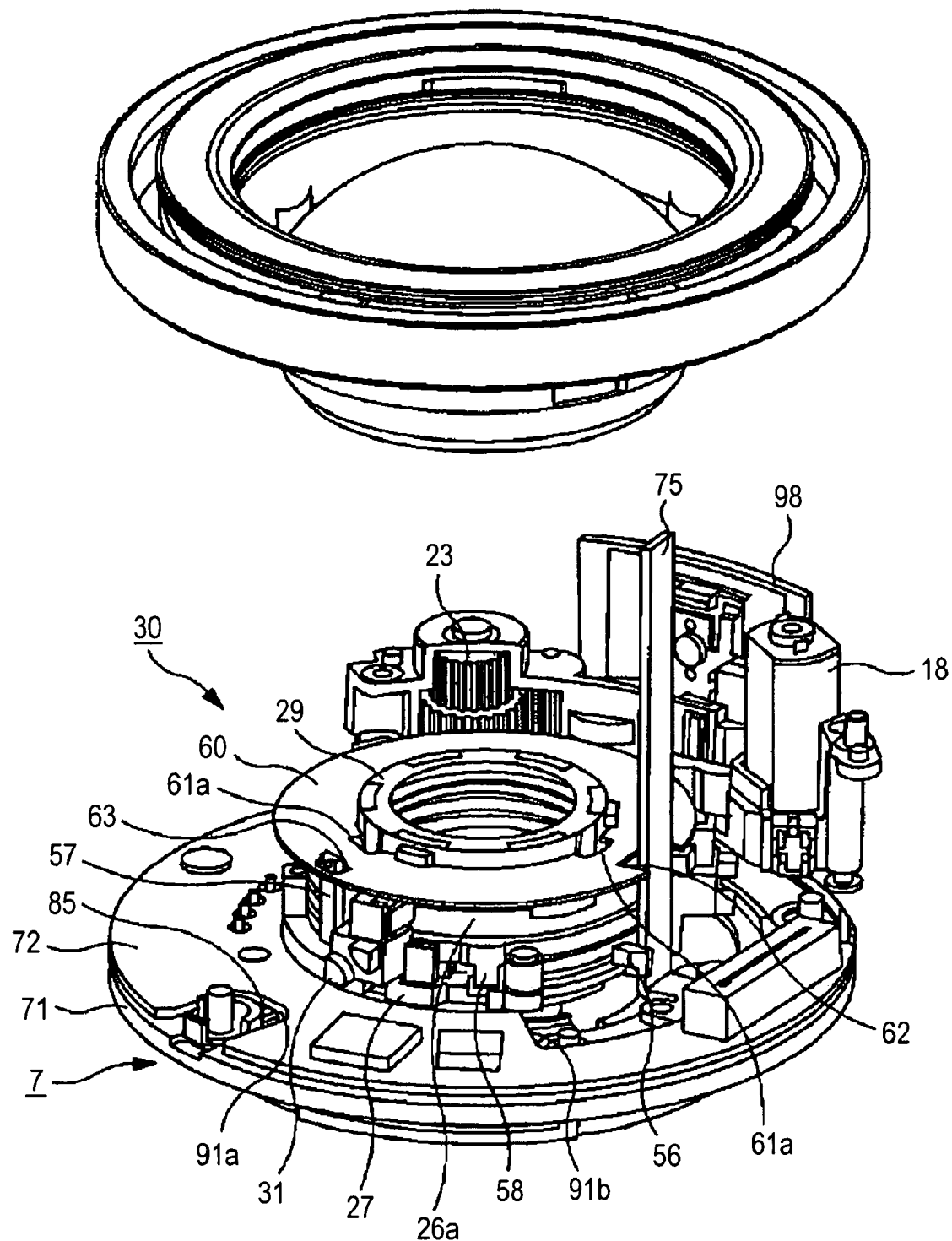
FIG. 8A is a perspective view showing the interior of a barrel body when the movable block is moved to a wide-angle side.
Figure 8B:
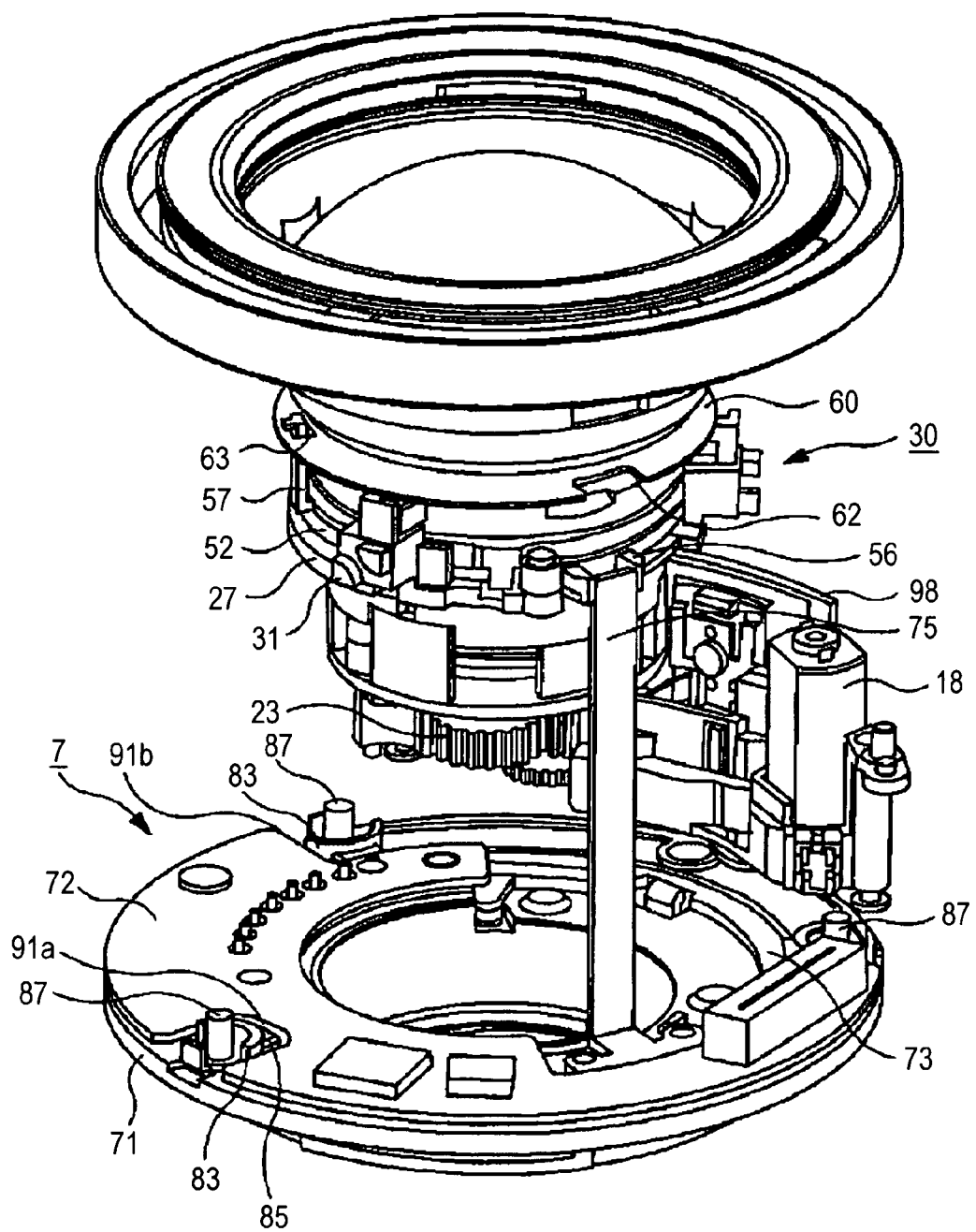
FIG. 8B is a perspective view showing the interior of the barrel body when the movable block is moved to a telescopic side.

That is, the engagement between the light-blocking plate 60 and the operation arm 75 is maintained, as shown in FIG. 8A, when the movable block 30 is moved to the rear side of the barrel body 10, which is the wide-angle side. On the other hand, the operation arm 75 that has engaged the light-blocking plate 60 disengages therefrom, as shown in FIG. 8B, when the movable block 30 is moved to the front end of the barrel body 10, which is the telescopic side. Even in this case, the light-blocking plate 60 will not fall off the movable block 30 because the engagement between the engaging piece 57 of the diaphragm operating plate 52 and the engaging hole 63 in the light-blocking plate 60 is maintained.

The tip of the engaging piece 57 is formed into a hook-shaped, embossed portion 57a, which prevents the engaging piece 57 from coming out of the engaging hole 63. Only one engaging piece 57 is formed on the diaphragm operating plate 52, and only one engaging hole 63 is formed in the light-blocking plate 60 accordingly. Therefore, in the interchangeable lens 3, the size of the opening formed in the light-blocking plate 60 can be minimized to reduce the amount of unwanted incident light.

The pressing plate 53, which presses the diaphragm blades 51 against the diaphragm operating plate 52, has a disc shape with a central opening. The principal surface of the pressing plate 53 has support holes that pivotally engage the support protrusions on the diaphragm blades 51, and the number of support holes corresponds to the number of diaphragm blades 51. The pressing plate 53 further has the locking pins 58 that are formed on the outer circumferential surface thereof and slidably lock the locking edges 55 of the diaphragm operating plate 52. The locking pins 58 are formed on the outer circumferential surface of the pressing plate 53, for example, at three locations, and locked by the locking edges 55 formed on the diaphragm operating plate 52 in correspondence with the locking pins 58. The tip of each of the locking pins 58 protrudes inward to form a locking portion that locks the corresponding locking edge 55. In the diaphragm unit 50, the locking portion slides along the locking edge 55 when the diaphragm operating plate 52 rotates relative to the pressing plate 53.

The light-blocking plate 60 attached to the movable block 30 will next be described. The light-blocking plate 60 prevents unwanted light in the barrel body 10 from entering the camera body 2, and has a disc shape having a diameter that is substantially the same as that of the fixed ring. The light-blocking plate 60 has an opening 61 that is formed at the center and through which the placement portion 29 of the first zoom lens holding frame 26a passes. The opening 61 has a diameter that is substantially the same as the outer diameter of the placement portion 29. The opening 61 is placed in such a way that it blocks unwanted incident light and the light-blocking plate 60 can rotate without causing any stress, for example, resulting from friction with the outer circumferential surface of the placement portion 29. The opening 61 has recesses 61a through which the locking protrusions 29a formed on the outer circumference of the placement portion 29 pass, and the recesses 61a are formed, for example, at three locations in correspondence with the locking protrusions 29a. The light-blocking plate 60 is placed on the placement portion 29 when the locking protrusions 29a pass through the recesses 61a.

The light-blocking plate 60 further has a cutout 62 that is formed at part of the periphery and through which the operation arm 75 on the diaphragm operating ring 73, which will be described later, passes. The cutout 62 has a width that is substantially the same as the width of the operation arm 75, whereby unwanted incident light is blocked and no stress resulting from, for example, friction with the operation arm 75 occurs when the movable block 30 moves.

The light-blocking plate 60 further has the engaging hole 63, which the engaging piece 57 standing from the diaphragm operating plate 52 in the diaphragm unit 50 passes through and engages. The engaging hole 63 has a size not only necessary to allow the engaging piece 57 to pass through but also capable of blocking unwanted incident light, and is locked by the hook-shaped portion 57a formed at the tip of the engaging piece 57.

As described above, with the operation arm 75 passing through the cutout 62 and the engaging piece 57 passing through the engaging hole 63, the light-blocking plate 60, when the operation arm 75 rotates the diaphragm operating plate 52, is rotated by the engaging piece 57 and the operation arm 75 in the same direction as the direction in which the diaphragm operating plate 52 is rotated. Therefore, the cutout 62 in the light-blocking plate 60 only needs to have an opening with a minimum width necessary to allow the operation arm 75 to pass through but does not need to be open over the region where the operation arm 75 pivots. The light-blocking plate 60 can therefore block more unwanted incident light and reliably prevent ghost and flare images.

As shown in FIG. 8B, the light-blocking plate 60 will not fall off the placement portion 29 even when the movable block 30 is moved to the front end of the barrel body 10, which is the telescopic side, because the engagement between the light-blocking plate 60 and the engaging piece 57 is maintained.

Further, since the light-blocking plate 60 engages the operation arm 75 and the engaging piece 57 except when the movable block 30 is moved to the front end of the barrel body 10, which is the telescopic side, the material of the light-blocking plate 60 does not need to be highly rigid but can be selected from a wide range of materials, in which case the rotation of the placement portion 29 and the slide motion of the operation arm 75 are still smooth. Moreover, the light-blocking plate 60 does not need to be thick to provide rigidity but can be thin and light.

Figure 9:
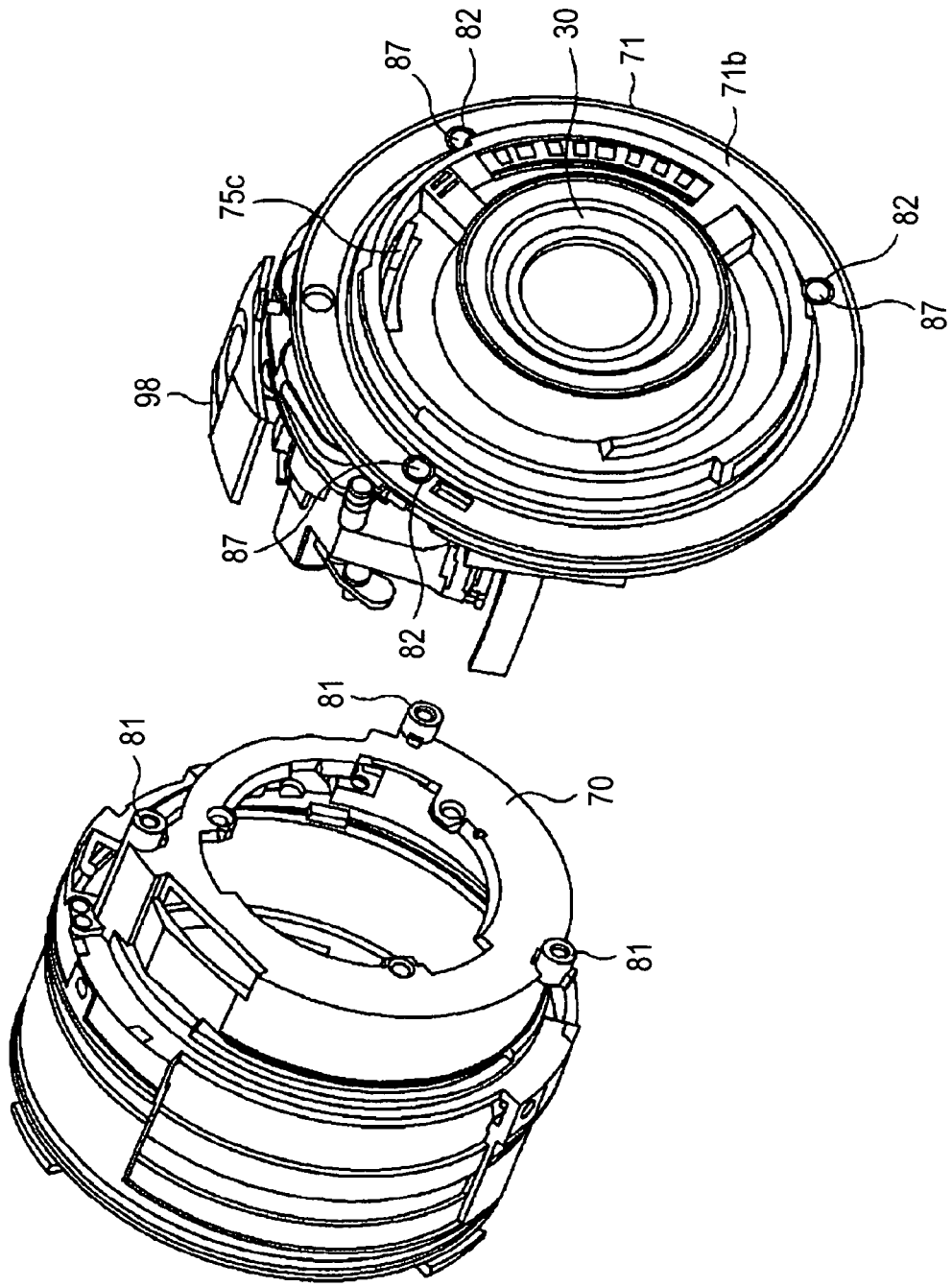
FIG. 9 is an exploded perspective view showing the mount block viewed from the rear side of the barrel body.
Figure 10:
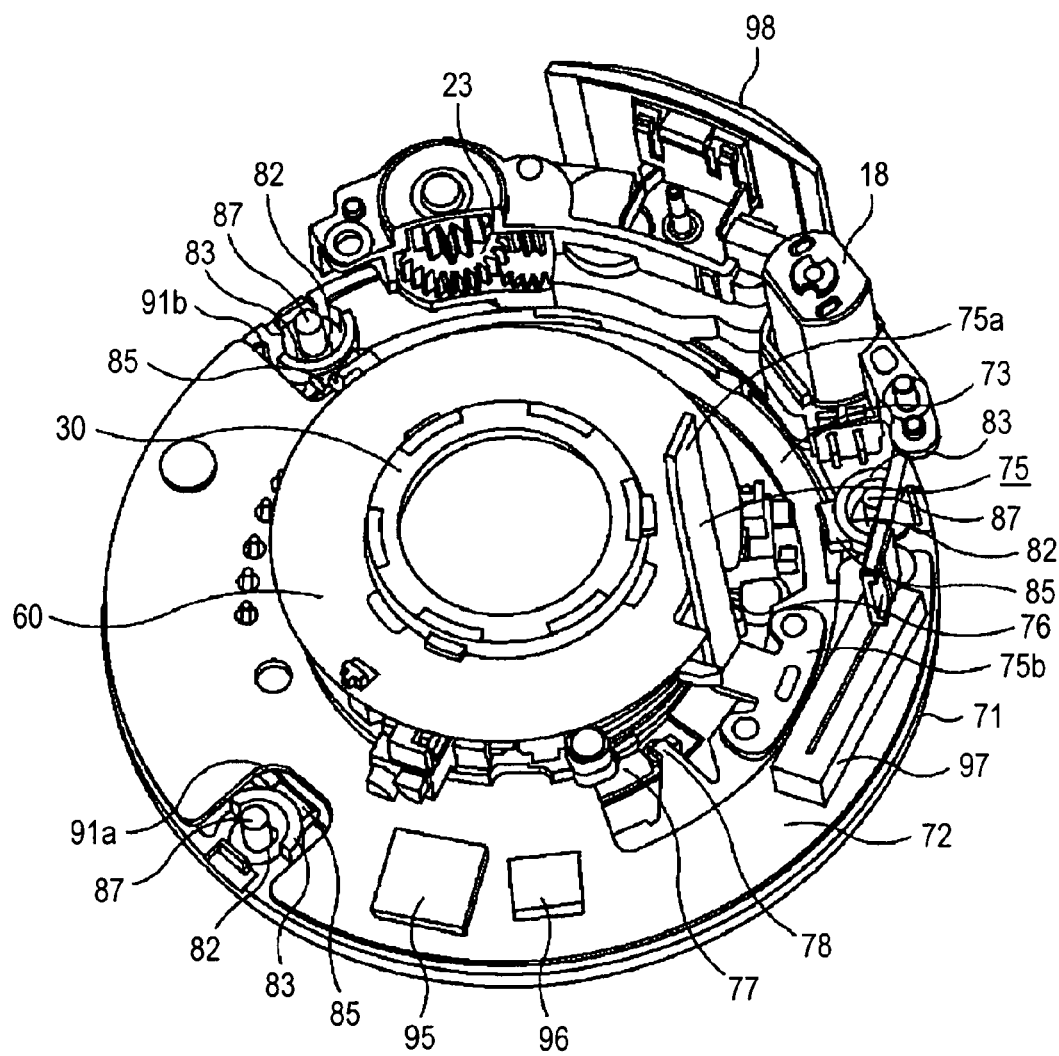
FIG. 10 is a perspective view showing the mount block.

The mount block 7 including the diaphragm operating ring 73, which rotates the diaphragm operating plate 52 in the diaphragm unit 50, will next be described. As shown in FIGS. 9 and 10, the mount block 7 includes the mount fixing member 70 attached to the fixed ring 35, the mount 71 mounted on the camera body 2, the substrate 72 on which a variety of drive circuits and connecters are implemented, and the diaphragm operating ring 73, which operates the diaphragm operating plate 52 in the diaphragm unit 50. The mount block 7 is integrated with the barrel body 10 when the mount 71 is attached to the mount fixing member 70. The substrate 72 and the diaphragm operating ring 73 are attached to the mount 71.

Figure 11:
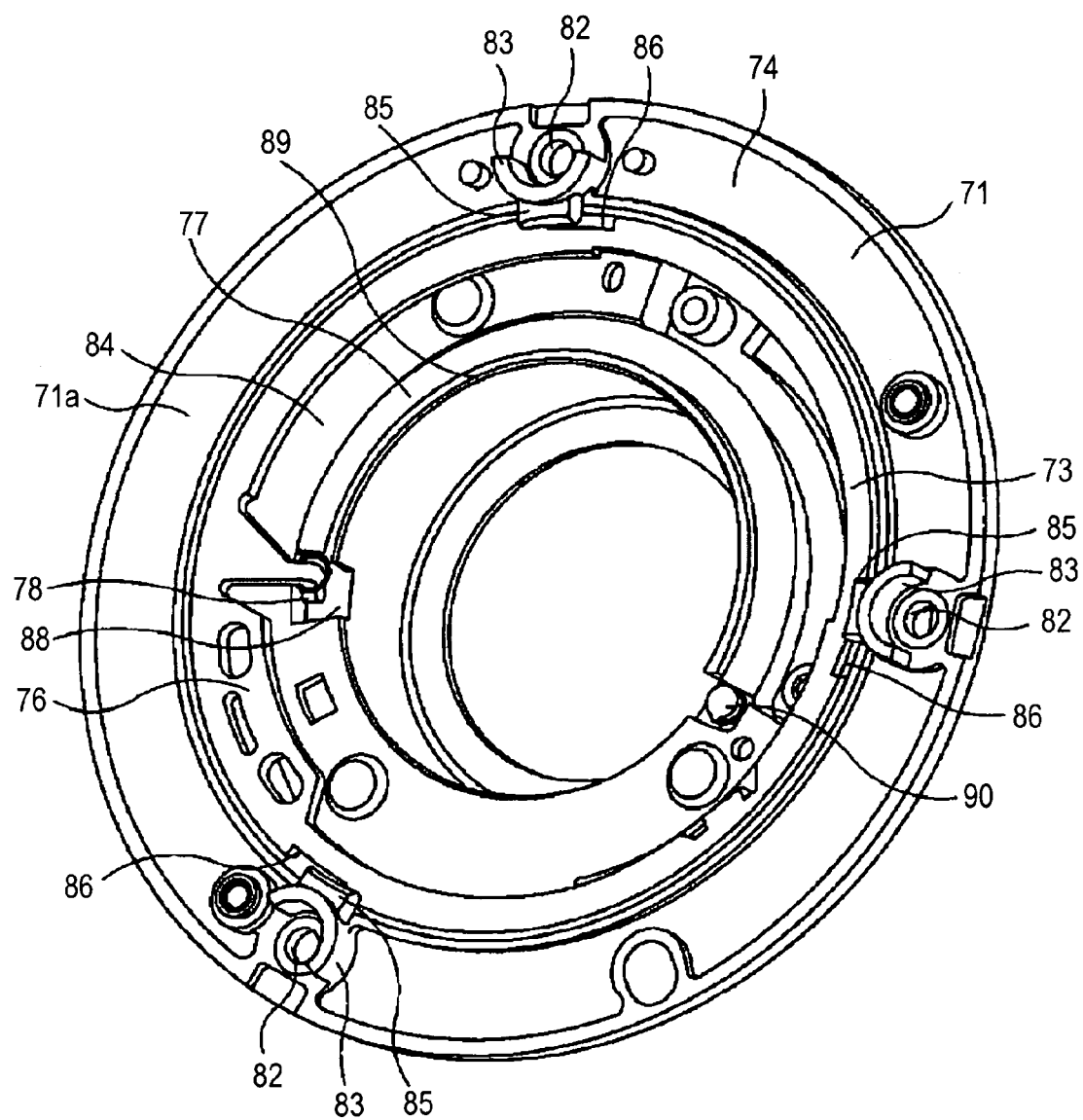
FIG. 11 is a perspective view showing one side of a mount on which a diaphragm operating ring is placed.

A description will first be made of the diaphragm operating ring 73, which operates the diaphragm operating plate 52 in the diaphragm unit 50 described above. As shown in FIGS. 10 and 11, the diaphragm operating ring 73 is a metallic annular member, and an operation arm attachment portion 76 and a spring locking portion 78 are formed at part of the inner circumference of the diaphragm operating ring 73. The operation arm attachment portion 76 receives the operation arm 75, which rotates the diaphragm operating plate 52, and the spring locking portion 78 locks one end of a coiled spring 77 that urges and rotates the diaphragm operating ring 73 in a certain direction. The diaphragm operating ring 73 fits in a support recess 84 provided in one surface 71a of the mount 71 and is rotatably supported along the sidewall of the support recess 84.

The operation arm 75 includes an arm 75a passing through the fixed ring 35 and then passing through the passage portion 56 of the diaphragm operating plate 52, a base 75b attached to the operation arm attachment portion 76 of the diaphragm operating ring 73, and a connection piece 75c (see FIG. 9) connected to a diaphragm drive lever 79 provided in the camera body 2. The operation arm 75 is integrated with the diaphragm operating ring 73 when the base 75b is attached to the operation arm attachment portion 76, and the arm 75a passes through the fixed ring 35 and then passes through the passage portion 56 of the diaphragm operating plate 52 and the cutout 62 in the light-blocking plate 60. The above configuration allows the arm 75a to rotate in the fixed ring 35 in the circumferential direction in coordination with the rotation of the diaphragm operating ring 73, whereby the operation arm 75 can rotate the diaphragm operating plate 52 and the light-blocking plate 60 in an integrated manner.

The arm 75a has a length long enough to remain engaged with the passage portion 56 of the diaphragm operating plate 52 even when the movable block 30 is moved to the front side of the barrel body 10, which is the telescopic side (FIG. 8B). The operation arm 75 can therefore rotate the diaphragm operating plate 52 over the region in which the movable block 30 can move.

The arm 75a disengages from the cutout 62 in the light-blocking plate 60 when the movable block 30 is moved to the front end of the barrel body 10, which is the telescopic side (FIG. 8B). The positional relationship between the arm 75a and the cutout 62 remains changed and the arm 75a can pass through again the cutout 62 because the engaging piece 57 of the diaphragm operating plate 52 still engages the engaging hole 63 in the light-blocking plate 60 and hence the diaphragm operating plate 52 and the light-blocking plate 60 are rotated in conjunction with the rotation of the operation arm 75. Further, the light-blocking plate 60 will not fall off the placement portion 29 of the first zoom lens holding frame 26a because the engaging piece 57 passes through and engages the engaging hole 63.

The coiled spring 77, which is locked by the spring locking portion 78 of the diaphragm operating ring 73, always urges the diaphragm operating ring 73 in the direction in which the diameter formed by the diaphragm blades 51 decreases because the spring locking portion 78 locks one end of the coiled spring 77 and the mount 71 locks the other end of the coiled spring 77.

As shown in FIG. 2, the connecting piece 75c of the operation arm 75, which is attached the diaphragm operating ring 73, is connected to the diaphragm drive lever 79 provided in the camera body 2, and the connecting piece 75c is driven by the diaphragm drive lever 79, on which a driving force produced by a diaphragm actuator 80 provided in the camera body 2 acts. The diaphragm operating ring 73 can thus rotate the mount 71 against the urging force of the coiled spring 77 to adjust the diameter of the opening formed by the diaphragm blades 51.

The mount 71, in which the diaphragm operating ring 73 fits, will next be described. The mount 71 is a substantially disc-shaped member having a circular opening that is formed at the center thereof and through which the movable block 30 passes. The mount 71 has two surfaces 71a and 71b; the diaphragm operating ring 73 and the substrate 72 are placed on one surface 71a that faces the interior of the barrel body 10, and a bayonet-type insert stub is formed on the other surface 71b that is attached to the camera body 2.

The mount 71 has attachment holes 82 that are formed in a periphery 74 and attached to attachment portions 81 of the mount fixing member 70. The attachment holes 82 are formed, for example, at three locations at predetermined spacings in the periphery 74 of the mount 71. Support walls 83 protrude from the one surface 71a of the mount 71 and partially surround the attachment holes 82. The support walls 83 support the attachment portions 81. Each of the support walls 83 has an arcuate shape in agreement with the shape of the attachment portion 81 and is disposed on the inner side of the attachment hole 82. The mount 71 is attached to the mount fixing member 70 by aligning the attachment holes 82 with the attachment portions 81 of the mount fixing member 70 and then inserting locking screws 87 through the other surface 71b.

The support recess 84, in which the diaphragm operating ring 73 fits, is formed in an inner part of the one side 71a of the mount 71. The support recess 84 has a circular shape having a diameter that is substantially the same as the outer diameter of the diaphragm operating ring 73, and the side surface of the support recess 84 guides the pivotal motion of the diaphragm operating ring 73. The diaphragm operating ring 73 is substantially flush with the periphery 74 of the mount 71 when the diaphragm operating ring 73 fits in the support recess 84.

The support recess 84 has locking stubs 85 that jut out therefrom and prevent the diaphragm operating ring 73 from coming out of the support recess 84. Each of the locking stubs 85 extends from the corresponding support wall 83, which stands partially around the attachment hole 82, toward the inner portion of the mount 71, and is hence radially aligned with the attachment hole 82 and the support wall 83 on the periphery 74 of the disc-shaped mount 71. The diaphragm operating ring 73 has cutouts 86 that correspond to the locking stubs 85, and fits in the support recess 84 by mating the cutouts 86 with the locking stubs 85. The locking stubs 85 protruding from the periphery 74 of the mount 71 thus position the diaphragm operating ring 73 in the optical axis direction.

A circular recess 88 in which the coiled spring 77 is disposed is formed inside the support recess 84. An arcuate locking wall 89 stands from the circular recess 88 along the circular opening formed at the center of the mount 71, and locks the stretched coiled spring 77. Further, a locking protrusion 90 stands from the circular recess 88 at one end of the locking wall 89, and locks the other end of the coiled spring 77.

The spring locking portion 78 of the diaphragm operating ring 73, which fits in the support recess 84, is located at the other end of the locking wall 89, which stands from the circular recess 88, and the coiled spring 77 extends along the locking wall 89 with one end of the coiled spring 77 locked by the spring locking portion 78 and the other end of the coiled spring 77 locked by the locking protrusion 90. Therefore, the coiled spring 77 pivots and urges the diaphragm operating ring 73 in one direction, and the diaphragm operating ring 73 in turn pivots and urges the diaphragm operating plate 52 in the direction in which the opening formed by the diaphragm blades 51 decreases in size.

The substrate 72 attached to the one surface 71a of the mount 71 will next be described. A control circuit that controls the components in the barrel body 10 is formed on the substrate 72, which has a C-like shape having a diameter that is substantially the same as the outer diameter of the mount 71. As shown in FIG. 10, the substrate 72 is attached to the periphery 74 of the mount 71 with screws or any other suitable fasteners.

To attach the substrate 72 to the periphery 74, clearances 91 are formed to prevent interference with the attachment holes 82, the support walls 83, and the locking stubs 85 formed on the periphery 74. The clearances 91 are formed where the attachment holes 82, the support walls 83, and the locking stubs 85 interfere with the substrate 72 attached above the periphery 74. Specifically in the present embodiment, the clearances 91 are formed in the substrate 72 substantially at the middle and one end thereof in the circumferential direction. A first clearance 91a formed in the substrate 72 substantially at the middle thereof in the circumferential direction has a rectangular shape that is open outward and surrounds the corresponding attachment hole 82, support wall 83, and locking stub 85 successively formed in the radial direction. A second clearance 91b formed in the substrate 72 at one end thereof in the circumferential direction has an L-like shape extending inward from the left side of the corresponding attachment hole 82, support wall 83, and locking stub 85.

As described above, providing the clearances 91 that prevent interference with the attachment holes 82, the support walls 83, and the locking stubs 85 formed on the periphery 74 of the mount 71 allows the substrate 72 to be attached to the periphery 74 of the mount 71 on which the attachment holes 82, the support walls 83, and the locking stubs 85 are formed. Therefore, since the substrate 72 can accommodate the height of the locking stubs 85, which lock the diaphragm operating ring 73 in the optical axis direction, the mount block 7 can be reduced in size in the optical axis direction as compared to a configuration in which the substrate 72 is supported by simply disposing it above the locking stubs 85. Since the disposed substrate 72 is substantially flush in the optical axis direction with the locking stubs 85, which position the diaphragm operating ring 73 in the optical axis direction, the substrate 72 and the locking stubs 85 will not interfere with the mount fixing member 70 when the mount 71 is attached to the mount fixing member 70.

Further, in the substrate 72, one clearance 91 suffices for each set of the locking stub 85 and the attachment hole 82 because they are disposed in a small area on the periphery 74 of the mount 71. Therefore, the substrate 72 does not need to have a large number of clearances 91 unlike a case where the attachment holes 82 and the locking stubs 85 are distributed over the area, or each of the clearances 91 does not need to be large because each set of the locking stub 85 and the attachment hole 82 is disposed in a small area. As a result, the space can be efficiently used, and the control circuit that controls the components in the barrel body 10 can be formed in a large area.

Figure 12:
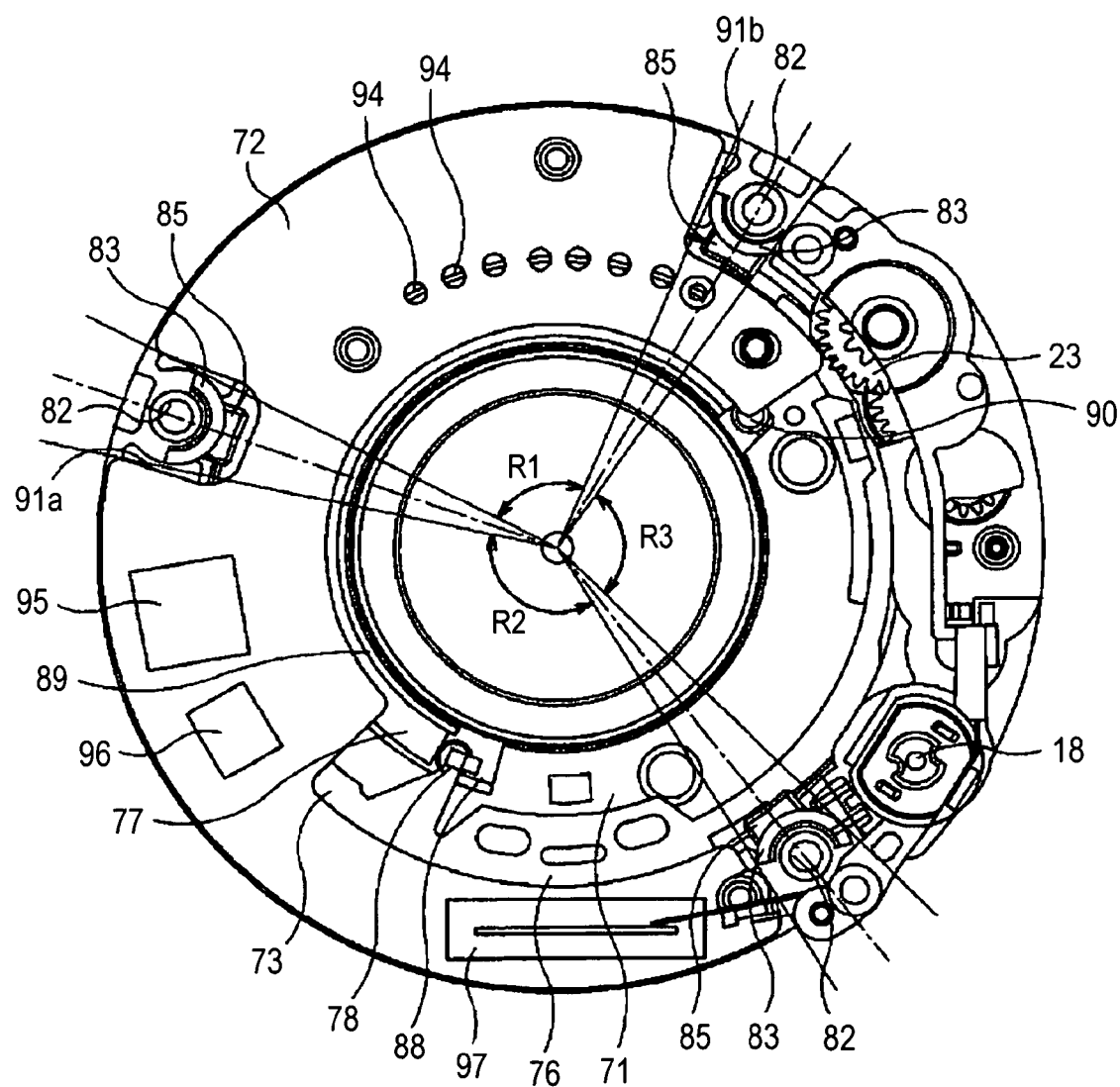
FIG. 12 is a plan view showing one side of the mount.

Further, since the attachment hole 82, the support wall 83, and the locking stub 85 in each set are formed successively in the radial direction on the periphery 74 of the mount 71, the corresponding clearance 91 in the substrate 72 can have a radially extending shape that prevents interference with the attachment hole 82, the support wall 83, and the locking stub 85. The substrate 72 can therefore provide large areas on both sides of the first clearance 91a in the circumferential direction, as shown in FIG. 12. For example, one side of the first clearance 91a in the circumferential direction can be a region R1 where connection pins 94 electrically connected to the camera body 2 are formed, and the other side of the first clearance 91a in the circumferential direction can be a region R2 where the control circuit including the microcomputer 95, a motor driver 96, a connector 97, and other electronic parts is formed. As described above, the substrate 72 does not need to occupy the entire area of the periphery 74 but effectively uses the available area to provide a large region where the control circuit is formed. Therefore, a region R3 of the periphery 74 of the mount 71 where no substrate is disposed can be a region where the autofocus motor 18 and the reduction gear train 23, which form the focus lens moving mechanism 13, are disposed.

As shown in FIG. 5, the autofocus motor 18 and the reduction gear train 23 form a drive unit that provides a driving force to the transfer ring for focusing 19, and the drive unit is attached to the region R3 on the periphery 74 of the mount 71 with screws or any other suitable fasteners. The drive unit further has a mode switch 98 incorporated therein, and the mode switch 98 switches the focus mode between a manual focus mode in which the user manually performs focusing control and an autofocus mode in which the focusing control is automatically performed.

It should be understood by those skilled in the art that various modifications, combinations, sub-combinations and alterations may occur depending on design requirements and other factors insofar as they are within the scope of the appended claims or the equivalents thereof.

What is claimed is:

1. A lens barrel comprising:
a barrel body;
a diaphragm pivotally held in the barrel body;
a diaphragm operating member that changes the diameter of the diaphragm, the diaphragm operating member having an engagement piece protruding therefrom;
an operation arm that can pivot in the barrel body and fits in the diaphragm operating member, the operation arm, when pivoted, changing the diameter of the diaphragm via the diaphragm operating member; and
a light-blocking plate that prevents unwanted light from entering the barrel body and has a passage cutout through which the operation arm passes and an engagement portion that the engaging piece protruding from the diaphragm operating member engages so as to prevent the light-blocking plate from separating from the diaphragm operating member during operational movement thereof along an optical axis direction, the light-blocking plate, along with the diaphragm operating member, pivotally supported,
wherein the passage cutout has an opening having a width that is substantially the same as the width of the operation arm, and
wherein the light-blocking plate has a disc shape with a predetermined outer diameter with the passage cutout of the light-blocking plate being formed on a periphery thereof, and the light-blocking plate further has a circular opening in a center thereof which is configured to allow a portion of a lens holding frame to pass.

2. The lens barrel according to claim 1,
wherein the light-blocking plate and the diaphragm operating member are attached to a moving frame supported movably in the optical axis direction, and the light-blocking plate can move to a region where the operation arm disengages from the light-blocking plate.

3. An imaging apparatus comprising:
an apparatus body; and
a lens barrel,
the lens barrel including
a barrel body,
a diaphragm pivotally held in the barrel body,
a diaphragm operating member that changes the diameter of the diaphragm, the diaphragm operating member having an engagement piece protruding therefrom,
an operation arm that can pivot in the barrel body and fits in the diaphragm operating member, the operation arm, when pivoted, changing the diameter of the diaphragm via the diaphragm operating member, and
a light-blocking plate that prevents unwanted light from entering the barrel body and has a passage cutout through which the operation arm passes and an engagement portion that the engaging piece protruding from the diaphragm operating member engages so as to prevent the light-blocking plate from separating from the diaphragm operating member during operational movement thereof along an optical axis direction, the light-blocking plate, along with the diaphragm operating member, pivotally supported,
wherein the passage cutout has an opening having a width that is substantially the same as the width of the operation arm, and
wherein the light-blocking plate has a disc shape with a predetermined outer diameter with the passage cutout of the light-blocking plate being formed on a periphery thereof, and the light-blocking plate further has a circular opening in a center thereof which is configured to allow a portion of a lens holding frame to pass.

* * * * *